US009560233B2

(12) United States Patent
Hanano

(10) Patent No.: US 9,560,233 B2
(45) Date of Patent: Jan. 31, 2017

(54) INFORMATION PROCESSING APPARATUS THAT IS CAPABLE OF CONTROLLING SCANNER AND THAT WHEN AN APPLICATION IS ACTIVATED TRANSMITS DEVICE INFORMATION INDICATING A DEVICE CONNECTED TO THE APPARATUS TO THE APPLICATION, AND CONTROL METHOD FOR THE SAME

(71) Applicant: CANON KABUSHIKI KAISHA, Tokyo (JP)

(72) Inventor: Hideki Hanano, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/934,100

(22) Filed: Jul. 2, 2013

(65) Prior Publication Data

US 2014/0009778 A1    Jan. 9, 2014

(30) Foreign Application Priority Data

Jul. 9, 2012  (JP) .................................. 2012-153674

(51) Int. Cl.
| | | |
|---|---|---|
| *H04N 1/40* | (2006.01) | |
| *H04N 1/32* | (2006.01) | |
| *H04N 1/04* | (2006.01) | |
| *H04N 1/00* | (2006.01) | |

(52) U.S. Cl.
CPC ...... *H04N 1/00962* (2013.01); *H04N 1/00225* (2013.01); *H04N 2201/0074* (2013.01)

(58) Field of Classification Search
CPC ............ H04N 1/00225; H04N 1/00795; H04N 1/00801; H04N 1/00962; H04N 2201/3215; H04N 2201/3274; H04N 1/00938; H04N 1/00928; H04N 1/00933; G06F 9/4411; G06F 9/445; G06F 9/542
USPC ....... 358/1.13, 474, 448, 468; 382/195, 312; 719/321, 328, 330
See application file for complete search history.

(56) References Cited

U.S. PATENT DOCUMENTS

| | | | | | |
|---|---|---|---|---|---|
| 5,966,219 | A | * | 10/1999 | Mori .............................. | 358/474 |
| 2001/0035983 | A1 | * | 11/2001 | Abe ................... | H04N 1/00474 358/468 |
| 2009/0015862 | A1 | * | 1/2009 | Kim ................... | H04N 1/00408 358/474 |
| 2010/0146523 | A1 | * | 6/2010 | Brigaut .................. | G06F 21/53 719/330 |
| 2010/0322520 | A1 | * | 12/2010 | Yoshida ........................ | 382/312 |
| 2011/0032563 | A1 | * | 2/2011 | Matsuzawa .................. | 358/1.15 |
| 2011/0265100 | A1 | * | 10/2011 | Hanano ......................... | 719/321 |

(Continued)

FOREIGN PATENT DOCUMENTS

| | | |
|---|---|---|
| JP | 11-355481 A | 12/1999 |
| JP | 2012-044420 A | 3/2012 |

*Primary Examiner* — Benny Q Tieu
*Assistant Examiner* — Juan M Guillermety
(74) *Attorney, Agent, or Firm* — Canon U.S.A., Inc. IP Division

(57) ABSTRACT

In an information processing apparatus controlling a scanner, a reading instruction and a reading setting made in the scanner is detected by the scanner driver. When the reading instruction is detected, reading to be performed according to the detected reading setting is acquired by an application via an operating system, and the scanner driver is instructed that the scanner executes the reading according to the acquired reading setting, with the application.

17 Claims, 16 Drawing Sheets

(56) References Cited

U.S. PATENT DOCUMENTS

| | | | |
|---|---|---|---|
| 2011/0265102 A1* | 10/2011 | Hanano | 719/328 |
| 2012/0120440 A1* | 5/2012 | Ueda | 358/1.15 |
| 2012/0257233 A1* | 10/2012 | Kishida | H04N 1/00962 358/1.13 |
| 2013/0003133 A1* | 1/2013 | Yamamoto | 358/448 |

* cited by examiner

FIG.4A

| STORAGE DESTINATION | DOCUMENT TYPE |
|---|---|
| PERSONAL COMPUTER | DOCUMENT PHOTOGRAPH FILM |
| ATTACH TO MAIL | DOCUMENT PHOTOGRAPH FILM |
| MEMORY CARD | DOCUMENT PHOTOGRAPH |

FIG.4B

| DOCUMENT TYPE | READING SETTING |
|---|---|
| DOCUMENT | READING SIZE<br>STORAGE FORMAT<br>RESOLUTION<br>ADF DOCUMENT ORIENTATION<br>ADF TWO-SIDED READING<br>SHOW-THROUGH REDUCTION<br>MOIRE REDUCTION<br>CONTOUR ENHANCEMENT |
| PHOTOGRAPH | READING SIZE<br>STORAGE FORMAT<br>RESOLUTION<br>CONTOUR ENHANCEMENT |
| FILM | STORAGE FORMAT<br>RESOLUTION<br>CONTOUR ENHANCEMENT |

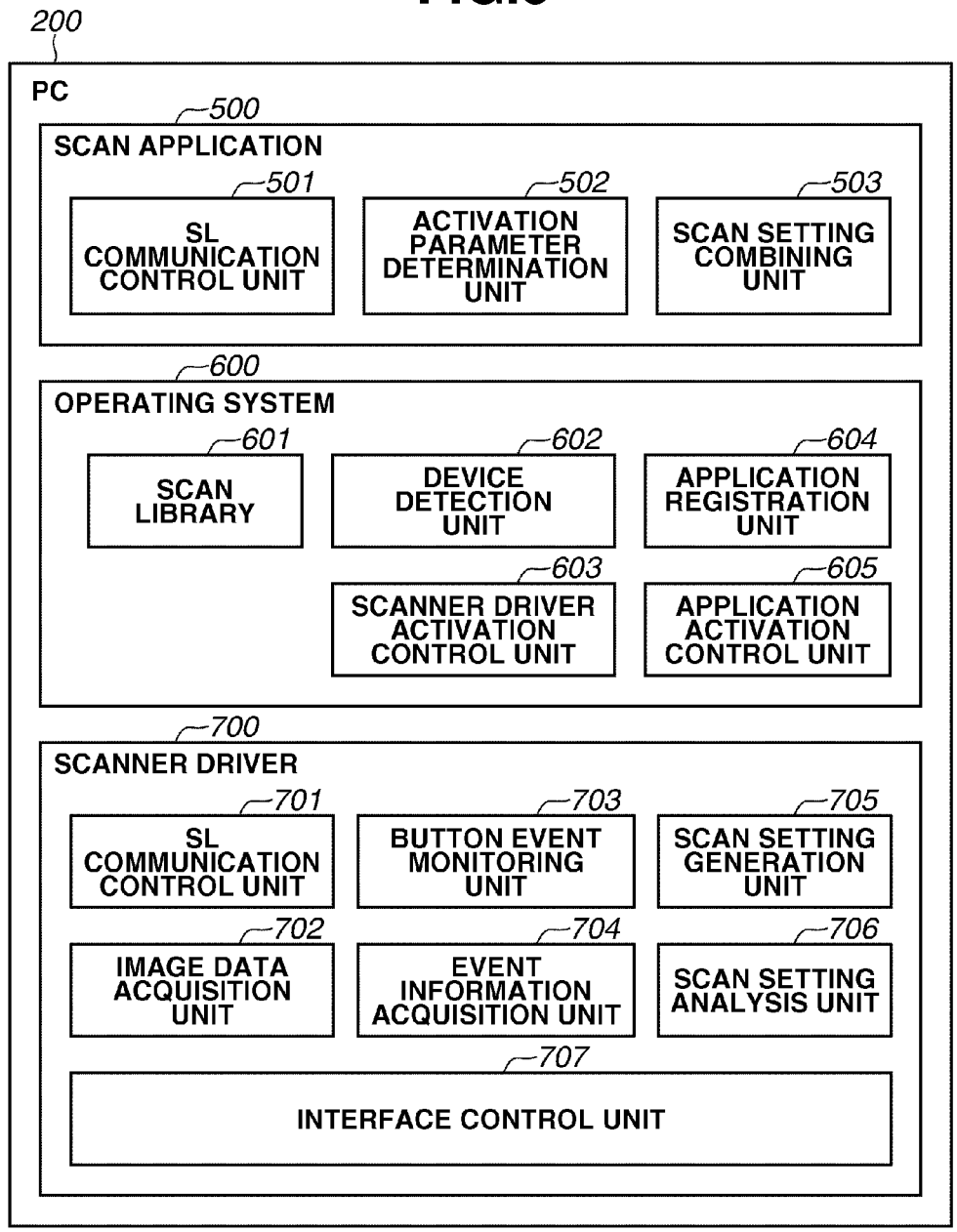

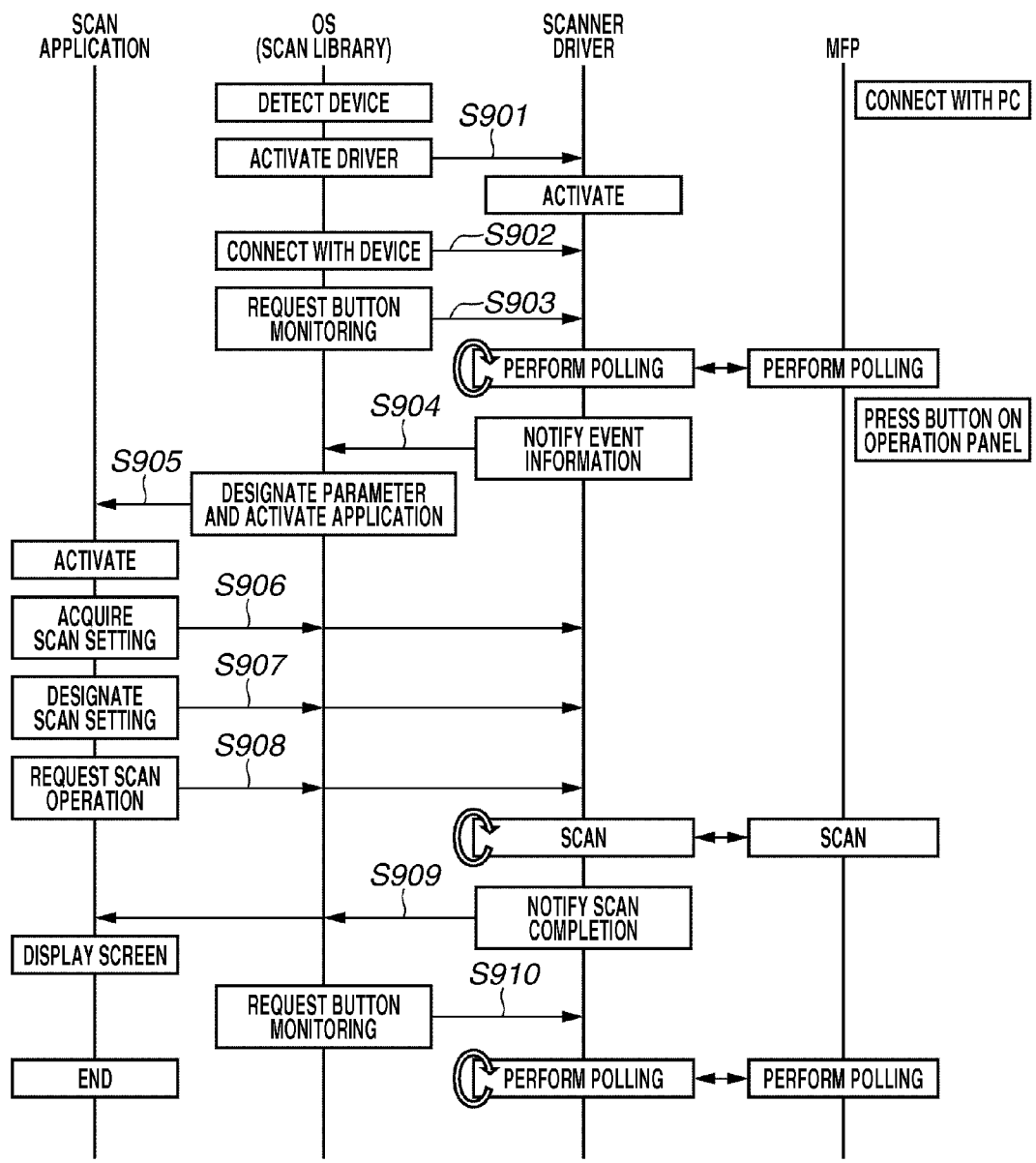

FIG.8A

| KEY | VALUE |
|---|---|
| EVENT TYPE | 1 (PUSH-SCAN) |
| ILLUMINANT TYPE | 0 (REFLECTIVE DOCUMENT) |
| COLOR MODE | 2 (RGB) |
| BIT DEPTH | 8 |
| RESOLUTION | 75 |
| READING WIDTH | 600 |
| READING HEIGHT | 800 |

FIG.8B

| KEY | VALUE |
|---|---|
| EVENT TYPE | 1 (PUSH-SCAN) |
| ILLUMINANT TYPE | 0 (REFLECTIVE DOCUMENT) |
| COLOR MODE | 2 (RGB) |
| BIT DEPTH | 8 |
| RESOLUTION | 75 |
| READING WIDTH | 600 |
| READING HEIGHT | 800 |
| FILE FORMAT | JPEG |
| STORAGE FOLDER | ~/Pictures |
| FILE NAME | Scan.jpg |

FIG.13

| KEY | VALUE |
|---|---|
| EVENT TYPE | 1 (PUSH-SCAN) |
| DATE AND TIME WHEN EVENT OCCURS | MAY 10, 2012, 15:20:25 |
| ILLUMINANT TYPE | 0 (REFLECTIVE DOCUMENT) |
| COLOR MODE | 2 (RGB) |
| BIT DEPTH | 8 |
| RESOLUTION | 75 |
| READING WIDTH | 600 |
| READING HEIGHT | 800 |

INFORMATION PROCESSING APPARATUS THAT IS CAPABLE OF CONTROLLING SCANNER AND THAT WHEN AN APPLICATION IS ACTIVATED TRANSMITS DEVICE INFORMATION INDICATING A DEVICE CONNECTED TO THE APPARATUS TO THE APPLICATION, AND CONTROL METHOD FOR THE SAME

BACKGROUND OF THE INVENTION

Field of the Invention

The present invention relates to an information processing apparatus capable of controlling a scanner and a control method for the same.

Description of the Related Art

Conventionally, an image scanner (hereinafter referred to as a scanner) serving as one of image input apparatuses notifies an information processing apparatus connected thereto of an event informing the intention of starting a scan operation, and executes the scan operation when receiving an instruction from an information terminal device based on the information. In such a conventional scanner, when a user operates an operation unit of the scanner to read an image, the scanner executes the scan operation, and image data acquired by the scan operation is transferred to the information terminal device connected to the scanner (see Japanese Patent Application Laid-Open No. 11-355481).

The information processing apparatus includes a button monitoring program for regularly monitoring a button event of the scanner to recognize that the user has performed the reading operation from the operation unit of the scanner. When receiving the event of pressing the reading start button from the scanner, the button monitoring program activates a predetermined application in the information processing apparatus, and acquires the image data via a scanner driver. The application causes the scanner driver to execute scan processing through an application program interface (API) conforming to the standard such as technology without an interesting name (TWAIN), and a windows image acquisition (WIA), thereby acquiring the image data. Moreover, the button monitoring program stores information about a reading setting made by using the operation unit of the scanner, in a shared memory of the information terminal device. Thus made reading setting is reflected in a scan operation performed by an instruction from the information processing apparatus. Then, the application activated by the button monitoring program accesses the shared memory to interpret the reading setting information, and instructs the scanner driver to execute the scan operation according to this reading setting information.

Meanwhile, there is an operating system (OS) for an information processing apparatus which employs a sandbox technology to prevent an unauthorized operation thereof. In such a system, an application and a device driver are subjected to sandbox to enhance system security. However, since the sandboxed application restricts an operation to that within the area protected by the system, the reading setting information cannot be accessed after activation of the application.

SUMMARY OF THE INVENTION

The present invention is directed to an information processing apparatus and a control method for the same.

The present invention is particularly directed to an information processing apparatus capable of flexibly performing an operation when a scanner executes reading according to a reading setting made in the scanner and an application acquires a read image, and is directed to a control method for the same.

According to an aspect of the present invention, an apparatus includes a detection unit configured to detect, using a scanner driver, a reading instruction and a reading setting made by a scanner, a first acquisition unit configured, when the reading instruction is detected in the detection unit, to cause an application to acquire the reading setting detected in the detection unit via an operation system, and an instruction unit configured to instruct the scanner driver that the application causes the scanner to execute reading according to the reading setting acquired by the first acquisition unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4A is a diagram illustrating examples of selectable storage destinations and document types for the storage destinations used when push-scan is performed.

FIG. 4B is a diagram illustrating examples of reading settings according to the document types used when the push-scan is performed.

FIG. 5 is a diagram illustrating a software configuration of the PC.

FIGS. 7, 10, 11, and 15 are flowcharts including sequences performed when the push-scan is performed.

FIGS. 8A and 13 are diagrams each illustrating an example of a scan setting included in event information of the push-scan.

FIG. 8B is a diagram illustrating an example of a scan setting designated by a scan application.

DESCRIPTION OF THE EMBODIMENTS

Various exemplary embodiments, features, and aspects of the invention will be described in detail below with reference to the drawings.

Figure 1A:
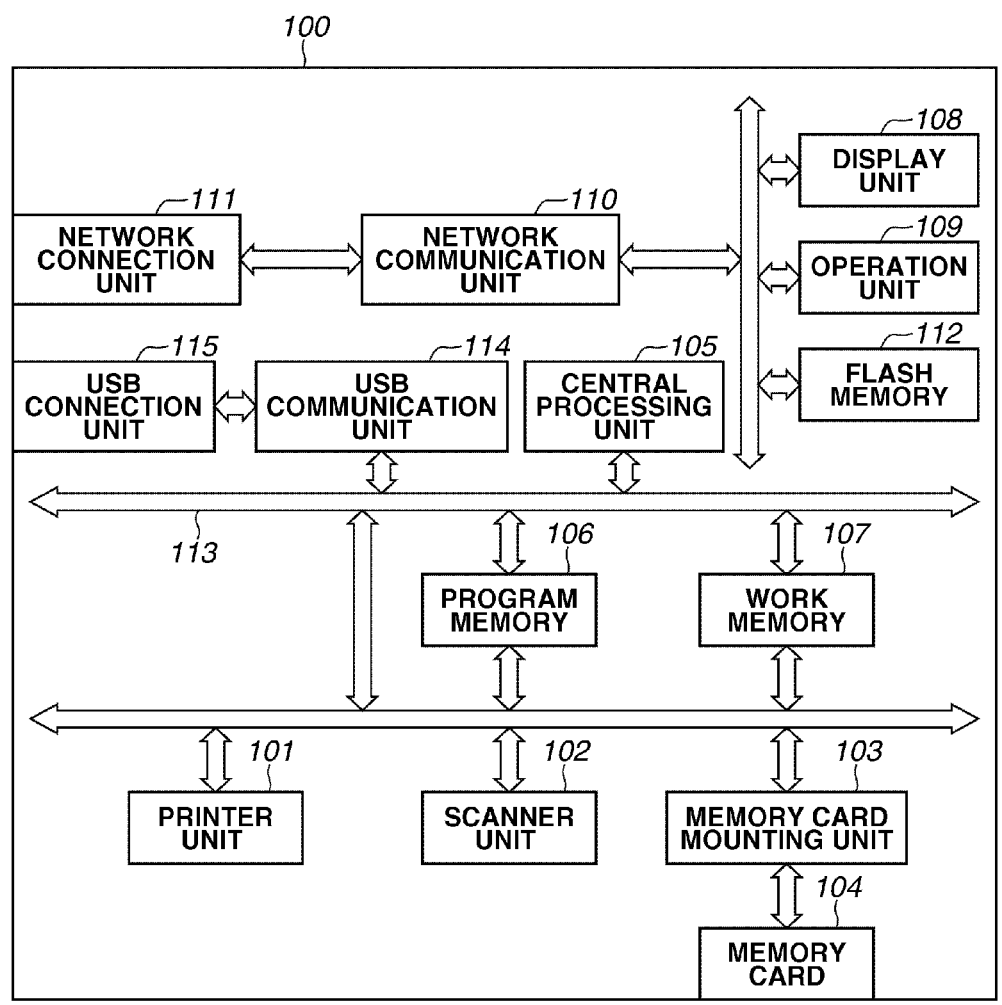
FIG. 1A is a block diagram illustrating a schematic configuration of a multi-function peripheral (MFP).
Figure 1B:
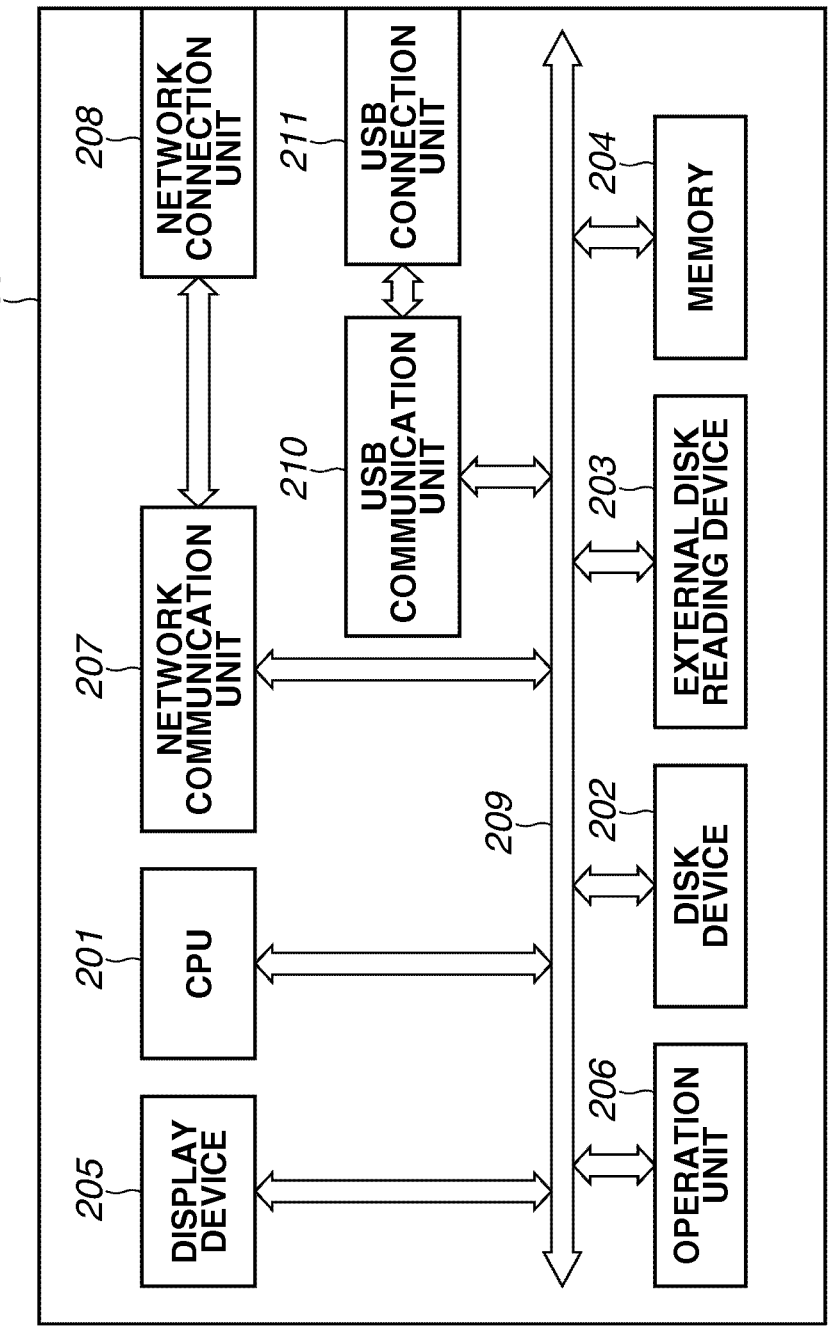
FIG. 1B is a block diagram illustrating a schematic configuration of a personal computer (PC).

The following exemplary embodiments are not intended to limit the scope of the claims of the present invention, and all the combinations of the features described in the exemplary embodiments are not always necessary for a problem to be solved by the present invention.

FIG. 1A is a block diagram illustrating a schematic configuration of an MFP 100 (a scanner) as one example according to a first exemplary embodiment of the present invention. The MFP 100 has a printer function, a scanner function, and a storage function. The MFP 100 can provide these functions to an external device via a network and a universal serial bus (USB). FIG. 1B is a block diagram illustrating a schematic configuration of a PC 200 as one example of an information processing apparatus according to the present exemplary embodiment. The MFP 100 and the PC 200 can communicate with each other.

In the MFP 100 illustrated in FIG. 1A, a printer unit 101 and a scanner unit 102 provide the printer function and the scanner function, respectively. A memory card mounting unit 103 and a memory card 104 provide the storage function. In the printer unit 101, each of print data received from an external unit and image data stored in the memory card 104 is printed as an image on a print medium by an ink jet method or an electrophotographic method. The scanner unit 102 optically reads an image on a document placed on a document positioning plate or fed from an automatic document feeding unit (ADF), and converts the document into image data. The image data acquired by the scanner unit 102 is converted into a designated file format. Upon conversion into the designated file format, the image data can be transmitted to an external device via the network and the USB, or stored in a memory. Moreover, the MFP 100 can transfer image data generated by the scanner unit 102 to the printer unit 101 so that the printer unit 101 can print and copy an image on a print medium based on the image data. In addition, the MFP 100 allows the external device connected via the network and the USB to read a file stored in the memory card 104, or allows the external device to store a file in the memory card 104.

Further, the MFP 100 includes a central processing unit (CPU) 105 for controlling each unit thereof, and a program memory 106 such as a read only memory (ROM) for storing a program code to be executed by the CPU 105. The MFP 100 also includes a work memory 107 such as a random access memory (RAM). The work memory 107 temporarily stores image data when each processing is executed by the CPU 105, or the work memory 107 is used for buffering. The MFP 100 includes a display unit 108 for displaying information to a user, and an operation unit 109 having various keys. The display unit 108 and the operation unit 109 may be combined as a touch-panel-type operation unit.

Moreover, the MFP 100 includes a network communication unit 110 for communications via the network, and a network connection unit 111 for connecting the MFP 100 to the network. The network communication unit 110 can deal with at least any one of a wired local area network (LAN) and a wireless LAN. If the network communication unit 110 can deal with the wired LAN, the network connection unit 111 serves as a connector for connecting a wired LAN cable to the MFP 100. If the network communication unit 110 can deal with the wireless LAN, the network connection unit 111 serves as a wireless communication antenna.

Moreover, the MFP 100 includes a flash memory 112 for storing various information acquired by the MFP 100 or input by a user.

The MFP 100 also includes a USB communication unit 114 for communicating with an external device via a USB interface according to the USB standards. The external device communicating with the MFP 100 via the USB interface is connected by a USB connection unit 115 such as a USB connector. The MFP 100 is required only to be able to connect to the external device by any one of the network connection unit 111 and the USB connection unit 115. Other local interfaces, instead of the USB, may be used to connect the MFP 100 to the external device.

Each of these units of the MFP 100 is connected to one another via a signal line 113. Herein, the MFP 100 serving as the scanner has the printer function and the storage function in addition to the scanner function. However, the MFP 100 may not necessarily have the printer function or the storage function. Alternatively, the MFP 100 may have other functions.

In FIG. 1B, a CPU 201 controls each unit of the PC 200. A disk device 202 stores an application program to be executed by the CPU 201, an operating system (OS), a program such as a scanner driver, and various files in a disk-type storage medium. The disk device 202 may be a device that handles a storage medium other than the disk-type. An external disk reading device 203 reads contents stored in a disk-type external storage medium (detachable) such as a compact disk read only memory (CD-ROM). The external disk reading device 203 may read contents stored in an external storage medium other than the disk-type external storage medium. A memory 204 is used by the CPU 201 to temporarily store data and perform buffering as needed. A display device 205 displays information to be provided to a user. The display device 205 can be installed in the PC 200, or externally attached to the PC 200. An operation unit 206 receives an operation performed by a user through a keyboard and a mouse. A network communication unit 207 performs various communications when the PC 200 is connected to a network, and a network connection unit 208 connects the PC 200 to the network.

The network communication unit 207 and the network connection unit 208 deal with at least any one of a wired LAN and a wireless LAN. The network communication unit 207 and the network connection unit 208 perform necessary functions in formats depending on the corresponding LAN. A USB communication unit 210 communicates with various peripheral devices via a USB interface according to the USB standards. A USB connection unit 211 includes a USB connector. The PC 200 is connectable to the peripheral device through any one of the network connection unit 208 and the USB connection unit 211. The PC 200 may be connected to the peripheral device through other local interfaces, instead of the USB. Each of these units is connected to one another via a signal line 209.

Figure 2:
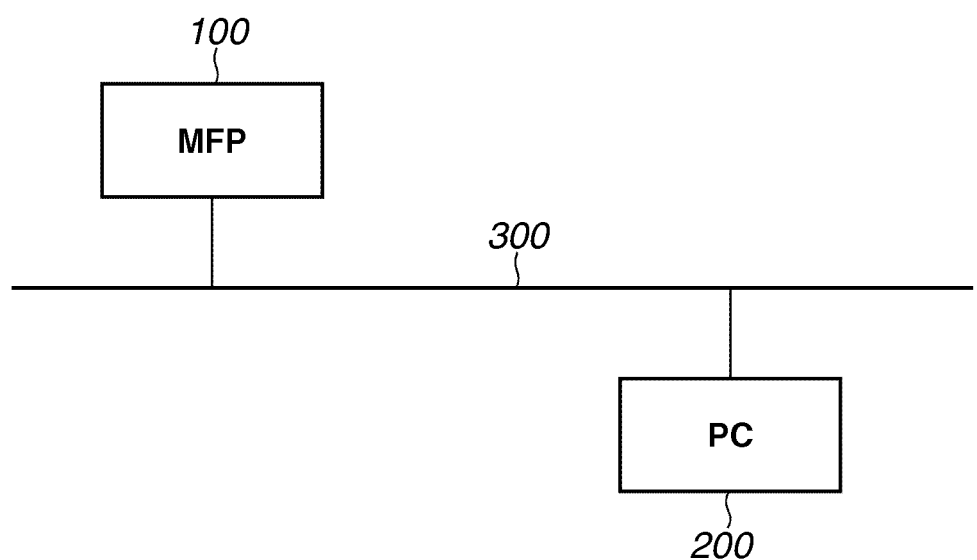
FIG. 2 is a diagram illustrating a schematic configuration of a system including the MFP and the PC.

FIG. 2 is a block diagram illustrating a schematic configuration of a system in which the MFP 100 illustrated in FIG. 1A and the PC 200 illustrated in FIG. 1B are connected. In the system as illustrated in FIG. 2, the MFP 100 is connected to a wired LAN 300 through the network connection unit 111, whereas the PC 200 is connected to the wired LAN 300 through the network connection unit 208.

In the following descriptions including the description with reference to FIG. 2, the MFP 100 and the PC 200 are connected through the wired LAN 300. However, the descriptions can be similarly applied to a case where the MFP 100 and the PC 200 are connected via a local interface such as wireless communication, USB, and FireWire. In FIG. 2, one PC and one MFP are used. Alternatively, a plurality of PCs and a plurality of MFPs (or devices dedicated to scanning) may be used, or even other apparatuses may be connected on the same LAN.

Figure 3:
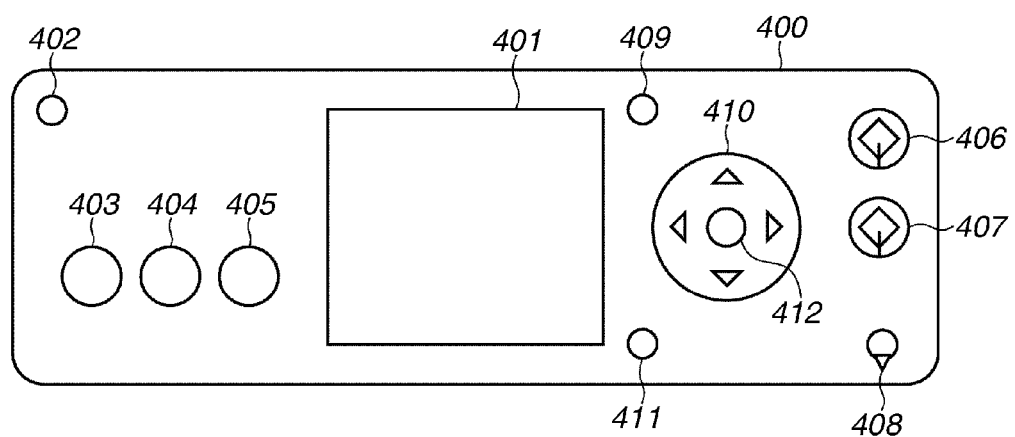
FIG. 3 is a diagram illustrating a configuration of an operation panel of the MFP.

FIG. 3 is a diagram illustrating a layout of an operation panel 400 including the display unit 108 and the operation unit 109 of the MFP 100 illustrated in FIG. 1A.

In FIG. 3, a display unit 401 corresponds to the display unit 108, and displays information including texts and graphics to a user. Operation keys 402 through 412 correspond to the operation unit 109, and are pressed when the user sets various instructions.

The power key 402 is pressed when the user selectively instructs the power ON or OFF of the MFP 100. The copy key 403 is pressed to execute a copy operation by using the scanner unit 102 and the printer unit 101. The scan key 404 is pressed to request (reading instruction) the scanner unit 102 to perform push-scan (pseudo-push-scan).

The push-scan represents a service for transmitting scanned data to a designated PC using the operation of the MFP 100 as a trigger for the transmission. The scanned data is acquired by reading an image on a document by the scanner unit 102. The user can select, for example, a location where the scanned data should be stored, a type of a document, and a reading setting to be applied to a scan operation by using the arrow key 410 and the determination key 412 while looking at the display unit 401. In the present exemplary embodiment, when the scan key 404 is operated, this operation is notified to the PC 200, and the pseudo-push-scan is executed according to an instruction from the PC 200.

The memory key 405 is pressed to execute processing on an image file stored in the memory card 104 if the memory card 104 is mounted to the memory card mounting unit 103. The memory card key 405 is used to display the image file inside the memory card 104 on the display unit 401, and print a designated image (hereinafter referred to memory card printing).

The color start key 406 is pressed to start operations of copying, push-scan, memory card printing in color. The color start key 406 should be pressed after a processing content is selected by using the copy key 403, the scan key 404, and the memory card key 405 to execute color processing. The monochrome start key 407 is pressed to start operations of copying, push-scan, memory card printing in monochrome. The cancel key 408 is used to stop operations of copying, push-scan, memory card printing being in execution.

The arrow key 410 is used to select an item on a processing menu displayed on the display unit 401, or a file intended to be printed or displayed in the memory card 104. The return key 411 is pressed so that a menu screen on the display unit 401 returns to a previous screen. The determination key 412 is used to determine the item which is cursor-displayed on the display unit 401.

FIG. 4A is a diagram illustrating examples of selectable storage destinations and document types for the storage destinations used when push-scan is performed. For example, when the scan key 404 is pressed, a list of storage destinations including "personal computer, attach to mail, memory card, USB memory" is displayed on the display unit 401. The display of this list on the display unit 401 prompts the user to select a location of the storage destination. Subsequently, the user selects a type of a document to be scanned, so that a reading setting according to the document type can be set.

Herein, if the user selects "personal computer" or "attach to mail" as a storage destination, the user needs to select a PC on which the push-scan is performed from among a PC connected via the USB and any one of a plurality of PCs connected on the network. Thus, a connection method, a PC name, or a username of a user logging in to the PC are displayed on the display unit 401, so that the user can select a storage destination, thereby transmitting the image data acquired by the push-scan to an appropriate destination.

Herein, if the user selects "memory card" as a storage destination, the image data acquired by the push-scan is stored in the memory card 104 which is loaded to the memory card mounting unit 103 of the MFP 100. Consequently, the scan operation is completed by performing the processing only in the MFP 100 without communications with the PC 200. In FIG. 4A, the memory card 104 is illustrated and described as an example. However, image data may be directly stored in a USB memory which is loaded to a USB memory mounting unit in a similar manner. Similarly, writable media such as a compact disk (CD), a digital versatile disk (DVD), and a hard disk drive (HDD) may be displayed in a list of storage destinations if these writable media are directly connected to the MFP 100.

Accordingly, image data may be stored in a selected writable medium.

FIG. 4B is a diagram illustrating examples of reading settings for document types used when the user performs push-scan. After selecting the storage destination and the document type as illustrated in FIG. 4A, the user can set a desired reading setting while checking various reading settings displayed on the display unit 401. As a reading size, the user can select a size such as A4, L-size, 2L-size, postcard, KG-size, business card, letter paper, and auto-crop. The auto-crop is a function used when a predetermined area (e.g., the entire surface) of a document on a document positioning plate is scanned and cropped according to a size of the document. As a storage format, the user can select a file format such as a joint photographic experts group (JPEG), a tagged image file format (TIFF), and a portable document format (PDF). Herein, a compression ratio of PDF or JPEG may be set when the file format is selected. As a resolution, the user can select a resolution such as 75 dpi, 150 dpi, 300 dpi, 600 dpi, 1200 dpi, 2400 dpi, and 4800 dpi. In a list of the resolutions, selectable resolutions (to be displayed) may be changed depending on a document type. As an ADF document orientation, the user can select an orientation of the document to be set in the ADF from a portrait-oriented image and a landscape-oriented image. This selection enables rotation and outputting of a scanned image in an appropriate direction. In ADF two-sided reading, the user can make a reading setting for the document set in the ADF, to either two-sided reading or one-sided reading. As for show-through reduction, the user makes a setting indicating whether to allow image processing for reducing show-through on a backside of a two-sided document. As for moire reduction, the user makes a setting indicating whether to allow image processing for reducing moire which may be generated, for example, when a magazine is scanned. As for contour enhancement, the user makes a setting indicating whether to allow image processing for enhancing a contour of an image.

Next, one example of a functional configuration of the PC 200 (a configuration of software installed in the PC 200) is described with reference to FIG. 5. Each functional unit functions, for example, when the CPU 201 loads a program stored (installed) in the disk device 202 using the memory 204 as a work area, and executes the program.

There are broadly three types of software installed in the PC 200. These three types are a scan application 500, an OS 600, and a scanner driver 700 each of which conforms to a predetermined image communication standard.

The OS 600 provides basic functions to various applications, and manages the entire the PC 200. The basic functions include an input and output function of controlling an output to the display device 205 and an input from the operation unit 206, and a function of managing a memory of the disk device 202.

Moreover, the OS 600 includes a scan library (SL) 601 for controlling the scan application 500 and the scanner driver 700. The SL 601 provides an API enabling communications with the scan application 500 and the scanner driver 700 according to the predetermined image communication standard.

Moreover, the OS 600 includes a device detection unit 602 and a scanner driver activation control unit 603. The device detection unit 602 detects that a peripheral device of the MFP 100 is connected (become communicable) via a local interface such as a network and a USB. If the detected peripheral device is a scanner, and if there is a scanner driver corresponding to the detected scanner, the scanner driver activation control unit 603 activates such a scanner driver. If the connection to the scanner through the network and the local interface is closed, but the scanner driver of the scanner is still being activated, the scanner driver activation control unit 603 terminates the scanner driver.

In addition, the OS 600 includes an application registration unit 604 and an application activation control unit 605. The application registration unit 604 registers an application to be activated by associating the application with information of an event occurrence in a peripheral device such as the MFP 100. In the course of application registration, the application registration unit 604 causes the display device 205 to display a screen on which the user can select a type of the peripheral device, a type of event information to be associated, and an application to be registered. Then, the application registration unit 604 registers the application selected by the user on the screen. The application activation control unit 605 activates the associated application when the corresponding event occurs, and provides an API for transferring detailed information of the event occurrence as a parameter to the activated application.

The scan application 500 is software for processing image data. The scan application 500 can acquire the image data from the scanner driver conforming to the predetermined image communication standard through the SL 601. After correcting and editing the acquired image data, the scan application 500 can display the image data on the display device 205, and store the image data in the disk device 202 as an image file. For example, the scan application 500 includes image editing software for editing image data, and an optical character recognition (OCR) software. The OCR software recognizes characters included in image data, and encodes the recognized characters.

The scan application 500 includes an SL communication control unit 501, an activation parameter determination unit 502, and a scan setting combining unit 503.

The SL communication control unit 501 gives and receives a command group conforming to the predetermined image communication standard, to/from the scanner driver 700 via the SL 601. The activation parameter determination unit 502 determines a program of a call source at the time of application activation, and determines a content of the parameter transferred at the time of activation. The scan setting combining unit 503 adds and edits various information about scan settings when requesting the scanner driver 700 to execute a scan operation.

The scanner driver 700 is a device driver corresponding to the scanner function of the MFP 100. The scanner driver 700 transmits a command to control the scanner unit 102 of the MFP 100, and receives image data and data indicating a state of the MFP 100. The command is transmitted and the image data is received through an interface control unit 707. The scanner driver 700 includes an SL communication control unit 701 and an image data acquisition unit 702.

The SL communication control unit 701 gives and receives a command group conforming to the predetermined image communication standard to/from the scan application 500 through the SL 601. The SL communication control unit 701 receives settings such as a reading resolution, a color mode, and a document size. In addition, the SL communication control unit 701 stores the image data read in response to the scan request in a designated folder.

The image data acquisition unit 702 acquires through the interface control unit 707 image data acquired by reading a document by the scanner unit 102 of the MFP 100. Moreover, the image data acquisition unit 702 stores the acquired image data in a memory (e.g., the disk device 202).

Moreover, the scanner driver 700 includes a button event monitoring unit 703, an event information acquisition unit 704, a scan setting generation unit 705, and a scan setting analysis unit 706.

The button event monitoring unit 703 regularly monitors a button event on the operation panel 400 of the MFP 100. The button event occurs when the user operates the operation panel 400. When the button event monitoring unit 703 detects the button event such as a reading start event on the operation panel 400, the event information acquisition unit 704 acquires scan setting data (various settings illustrated in FIGS. 4A and 4B) input by using the operation panel 400. Based on the scan setting data acquired by the event information acquisition unit 704, the scan setting generation unit 705 generates scan setting information as a setting value interpretable by the scan application 500 and the OS 600. The SL communication control unit 701 notifies the SL 601 of the event occurrence and the scan setting information. The scan setting analysis unit 706 analyzes scan setting information designated when the scan application 500 requests a scan operation, and collates the scan setting data input through the operation panel 400 of the MFP 100 with the analyzed scan setting information.

Figure 6:
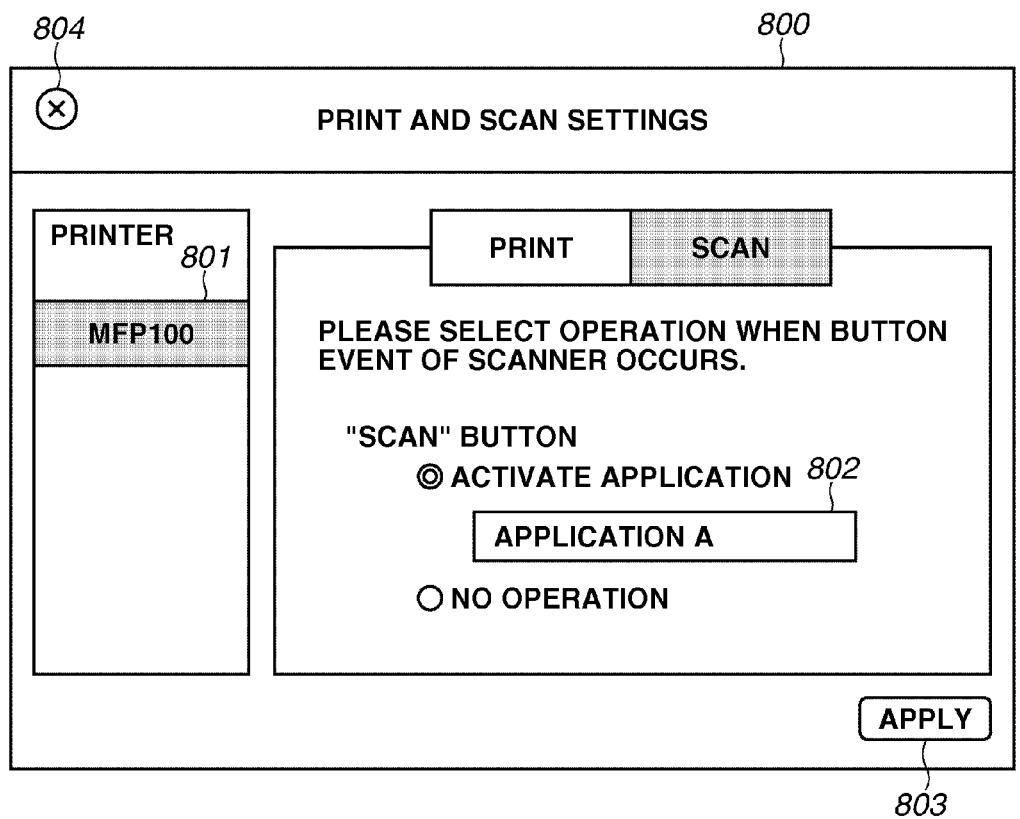
FIGS. 6 and 9 are diagrams each illustrating an example of a dialog box used when an application to be activated by a push event of the MFP is selected.

FIG. 6 is a diagram illustrating an example screen displayed on the display device 205 for selecting an application to be activated for a push event of the MFP 100. In FIG. 6, a device setting dialog box 800 is a screen displayed by the application registration unit 604 of the OS 600 so that a user can set various settings for the printer and the scanner. In a device list 801, a device being connected to the PC 200 and a device that has been previously connected to the PC 200 are displayed. The user can select a device for which the user desires to make a setting or a device for which the user desires to change a setting, from the device list 801. In a drop-down list 802, the user designates an application to be activated when a button event of the scanner occurs. Herein, applications installed in the PC 200 are displayed in the drop-down list 802 for the user to select a desired application. Alternatively, applications may be automatically set when the user installs a scanner driver and a scan application. Alternatively, a pre-installed standard application may be registered as an initial value. The user presses an apply button 803 to fix the contents set on this device setting dialog box 800. The user presses a close button 804 to close the device setting dialog box 800.

FIG. 7 is a flowchart including reading control sequences performed when pseudo-push-scan is performed by using the MFP 100 and the PC 200. Assume that the OS 600 of the PC 200 offers a high level security using a sandbox technology, and the scan application 500 and the scanner driver 700 are sandboxed programs.

Since an operation of the sandboxed program is restricted to that within a protected area in the system, the sandboxed program cannot access a general file on a shared memory. However, if a file generated by the user is to be shared with a plurality of applications, the program can access the file only when the folder is defined by the OS.

In step S901, when the device detection unit 602 detects the MFP 100, the OS 600 causes the scanner driver activation control unit 603 to activate the scanner driver 700 corresponding to the MFP 100. In step S902, the OS 600 issues a device connection command to the scanner driver 700 to request an establishment of connection with the MFP 100. In step S903, the OS 600 issues a button monitoring request command to the scanner driver 700 so that a button event is received when the button event occurs in the MFP 100. Herein, when the connection of the device is detected, the OS 600 activates the scanner driver 700 and issues the button monitoring request command. However, the scanner driver 700 may be activated only with respect to a target device registered beforehand by a user. This limits the number of devices performing button polling, thereby reducing network traffic in an environment in which a plurality of devices is connected on a network.

Upon receipt of the button monitoring request command subsequent to the activation, the scanner driver 700 causes the button event monitoring unit 703 to regularly perform polling to monitor a button event of the MFP 100. When a user operates a key such as the color start key 406 or the monochrome start key 407 on the operation panel 400 of the MFP 100, the button event monitoring unit 703 of the scanner driver 700 detects such a button event. The color start key 406 and the monochrome start key 407 are used to start a reading operation. In step S904, the event information acquisition unit 704 acquires the event information corresponding to the detected button event, and the SL communication control unit 701 notifies the SL 601 of the acquired event information. A content set in the event information is, for example, a file in a dictionary format as illustrated in FIG. 8A. In the event information, an event type and a scan setting (a setting made by the user from among the various settings illustrated in FIGS. 4A and 4B) corresponding to a document type used when the user performs pseudo-push-scan are stored as setting values interpretable by the SL 601 and the scan application 500.

In step S905, upon receipt of the event information notification, the SL 601 designates the event information as a parameter (an argument) specified at the time of activation, and causes the application activation control unit 605 to activate a predetermined application. Herein, the parameter to be designated is generated in a general-purpose format interpretable by various applications. Moreover, the SL 601 adds device information indicating the MFP 100 to the event information so that a device from which the event has occurred is identified. Alternatively, the scanner driver 700 may add this device information to the event information. Herein, the application to be activated is the scan application 500 registered in association with the button event of the MFP 100 by the application registration unit 604.

In step S906, when the scan application 500 is activated via the SL 601, the activation parameter determination unit 502 refers to the parameter specified at the time of activation, and issues a scan setting acquisition command to the scanner driver 700 corresponding to the relevant MFP 100. The contents of the scan setting to be acquired include device capability information such as an optical resolution, a readable area, and the presence or absence of ADF and film scan supports. This device capability information is used, for example, in a scan setting screen displayed by the scan application 500 when pull-scan (a scan operation is performed in response to a trigger from the scan application 500) is performed.

In step S907, the scan application 500 combines the scan settings in the scan setting combining unit 503 based on the event information, and issues a scan setting designation command so that the pseudo-push-scan is performed. Herein, anot er setting made by the scan application 500 is added to the scan setting made on the operation panel 400. FIG. 8B is a diagram illustrating an example of a combined scan setting. In FIG. 8B, first seven items are set by simply providing the event information as the parameters specified at the time of activation, whereas last three items are added to set a file format and a file name of image data to be received by the scan application 500. Thus, a scan operation can be executed according to the setting made on the operation panel 400, and image data acquired by this scan operation can be processed according to the added setting.

In step S908, when receiving from the scanner driver 700 a success response to the scan setting designation command, the scan application 500 issues a scan request command based on the scan setting combined by the scan setting combining unit 503. Upon receipt of the scan request command, the scanner driver 700 causes the scanner unit 102 of the MFP 100 to execute a scan operation based on the designated scan setting. The scanner driver 700 causes the image data acquisition unit 702 to acquire image data acquired by the scan operation, and generates an image file in a designated file format. In step S909, when the generation of the image file is completed, the scanner driver 700 notifies the scan application 500 of completion of the scan operation, and transmits the scanned image file to the scan application 500.

Upon receipt of the scan completion notification and the image file, the scan application 500 displays the image corresponding to the image file. For example, the image can be displayed as a thumbnail image on a main dialog box of the scan application 500, or displayed as an image file on a standard file management screen of the OS. The scan application 500 can display status information to notify the user of a progress state of the scan operation and a state of the MFP 100 when the pseudo-push-scan is executed. In step S910, the SL 601 issues a button monitoring request command to the scanner driver 700 which has notified the scan completion, thereby resuming the button polling.

According to the present exemplary embodiment, therefore, the PC 200 serving as an information processing apparatus controlling the scanner (the MFP 100) detects a reading instruction and a reading setting made in the MFP 100 (see steps S904 and S906). If this reading instruction is detected, the application (the scan application 500) is activated with the reading setting as an activation parameter (a parameter attached to an activation command). Specifically, when the scanner driver 700 detects the button event (the reading instruction), the scanner driver 700 notifies the OS 600 of the event information (the reading setting) set on the operation panel 400 of the MFP 100. The OS 600 transfers this event information to the scan application 500 as a parameter specified at the time of activation of the scan application 500. The scan application 500 requests the scanner driver 700 to cause the MFP 100 to execute a scan operation according to this event information. Since the scan application 500 has acquired the scan setting (the reading setting) made in the MFP 100, from the OS 600 as the parameter at the time of activation, the scan application 500 can acquire the reading setting even if it is sandboxed. Herein, the operations performed by the user are only placing a reading target document on the MFP 100 and providing a reading start instruction using the operation panel 400 of the MFP 100. Consequently, the processing method, which does not use a shared file between applications, can make the pseudo-push-scan function available to a user with a simple operation of the scanner by using a general-purpose application, even on the OS adaptable to the sandbox technology.

Moreover, the OS activates the application using a scan setting as an argument which is a general-purpose parameter, so that the pseudo-push-scan can be performed by using a general-purpose application. That is, the scan application 500 is not limited to an application capable of interpreting a scan setting unique to a scanner vendor, and can be various applications. Thus, even if an OS does not employ the sandbox technology, substantially the same effect can be achieved. Moreover, in the scan application 500, the reading setting detected in step S906 can be changed in step S907. This change of the reading setting includes addition of another setting to the detected reading setting in the scan application 500. Herein, the scan application 500 can allow processing on the image data acquired by the MFP 100 performing a reading operation according to the reading setting including the changed setting.

Next, a second exemplary embodiment of the present invention is described. In the first exemplary embodiment, when the scanner driver receives a button event, the scanner driver notifies the OS of the button event. Subsequently, the OS activates a predetermined scan application, and a scan operation is started based on the event information. That is, in the first exemplary embodiment, an image generation instruction to the scanner driver is issued by the scan application. In the second exemplary embodiment, on the other hand, an OS directly issues an image generation instruction. In the second exemplary embodiment, since configurations of an MFP and a PC, a schematic configuration of a system, and a layout configuration of an operation panel can be substantially the same as those described with reference to FIGS. 1 through 3 in the first exemplary embodiment, descriptions thereof are omitted.

Moreover, since a scan setting for pseudo-push scan and a software configuration of the PC in the present exemplary embodiment can be substantially the same as those described with reference to FIGS. 4 and 5 in the first exemplary embodiment, descriptions thereof are omitted.

However, each selection of a storage destination and a document type can be allocated to one key of an operation panel 400. In this way, a user can determine a storage destination and a document type by selecting the respective keys. For example, if a photograph button on the operation panel 400 is pressed, a document type is set to a "photograph". If a document button is pressed, a document type is set to a "document". If a mail button is pressed, a storage destination is set to "attach to mail". When "attach to mail" is set as the storage destination, predetermined electronic mail software installed in a PC 200 is activated, and an image file acquired by scanning an image is attached as an attachment file to a transmission document generation screen. In the following description, each selection of the storage destination and the document type is allocated to one key arranged on the operation panel 400, but is not limited thereto. Similarly, the user may switch a menu on the display unit 401 using an arrow key 410 and press a determination key 412. After pressing the determination key 412, the user may operate a color start key 406 or a monochrome start key 407.

Figure 9:
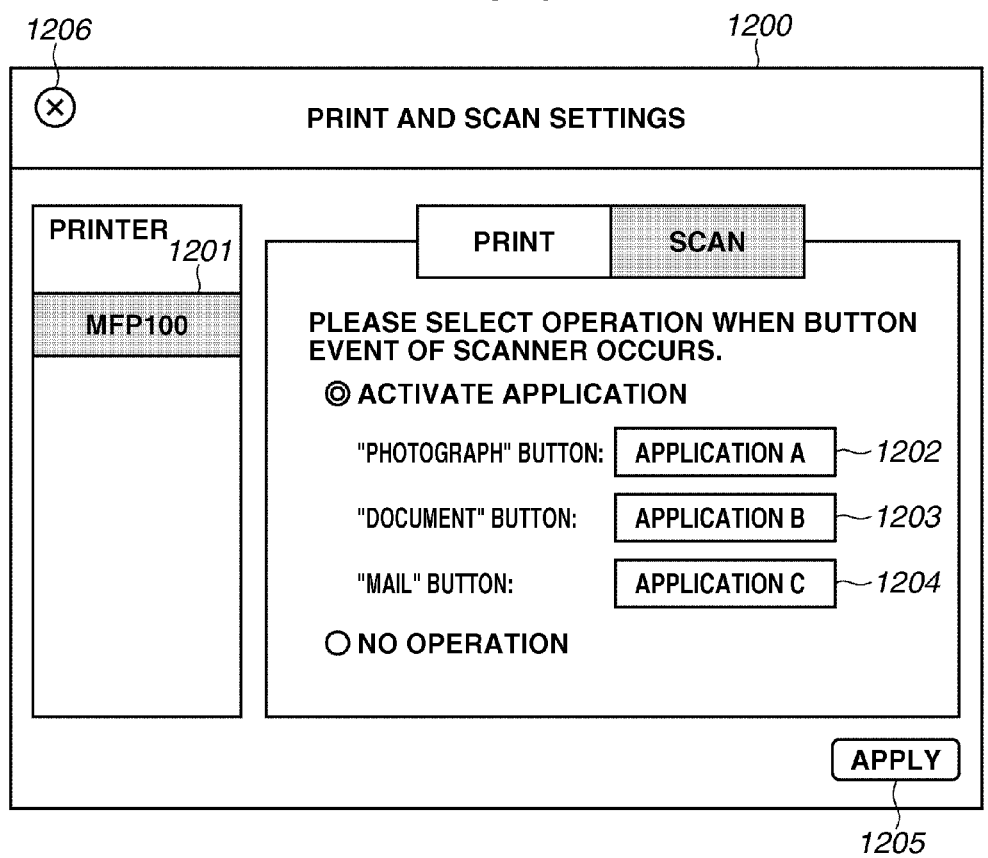

FIG. 9 is a diagram illustrating an example screen displayed on a display device 205 when a user selects an application to be activated in a push event of an MFP 100. In the example screen illustrated in FIG. 6 according to the first exemplary embodiment, an application is registered with respect to one type of button event. On the other hand, in the screen illustrated in FIG. 9 according to the second exemplary embodiment, applications are registered with respect to a plurality of types of button events. However, an application may be registered with respect to one type of button event similar to the case illustrated in FIG. 6. Moreover, in the first exemplary embodiment, applications may be registered for a plurality of types of button events as illustrated in FIG. 9.

In FIG. 9, a device setting dialog box 1200 is a screen displayed by an application registration unit 604 of an OS 600 so that the user sets various settings for a printer and a scanner. In a device list 1201, a device connected to the PC 200 and a device that has been previously connected to the PC 200 are displayed. The user can select a device for which the user desires to make a setting or a device for which the user desires to make a change in a setting from the device list 1201. In drop-down lists 1202 through 1204, the user designates an application to be activated when a button event of the scanner occurs. For example, if the user presses a photograph button, a desired image editing application is set. If the user presses a document button, a desired document editing application is set. If the user presses a mail button, a desired electronic mail application is set. Accordingly, the user can set applications according to various uses such as editing, processing, or transmitting an electronic mail of the scanned image by desired applications. In addition, applications may be automatically set when the user installs a scanner driver and a scan application. Alternatively, a pre-installed standard application may be registered as an initial value. In FIG. 9, an apply button 1205 is pressed to reflect the contents of the setting changed by the user. A close button 1206 is pressed to close the device setting dialog box 1260.

Figure 10:
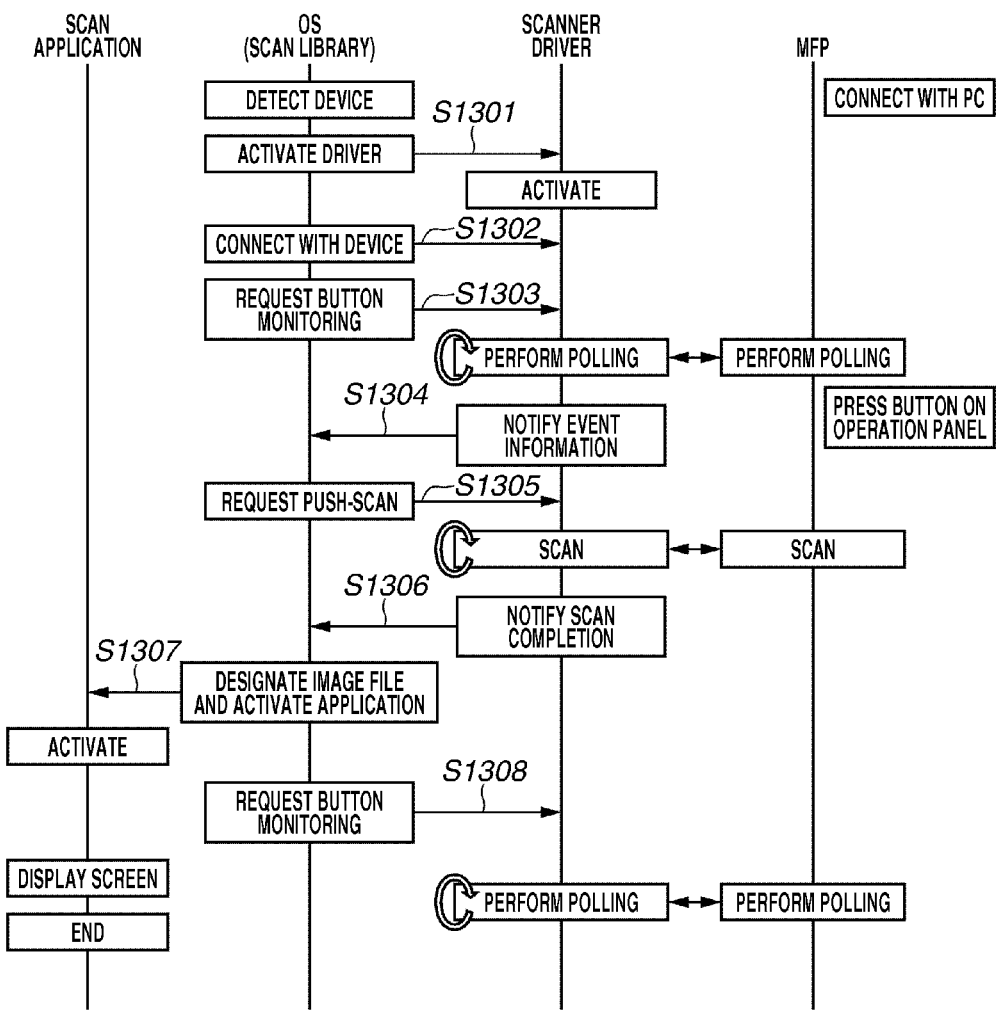

FIG. 10 is a flowchart including sequences performed when pseudo-push-scan is performed by the MFP 100 and the PC 200. Assume that the OS 600 of the PC 200 offers a high level security using a sandbox technology, and a scan application 500 and a scanner driver 700 are sandboxed programs.

In step S1301, when a device detection unit 602 detects the MFP 100, the OS 600 causes a scanner driver activation control unit 603 to activate the scanner driver 700 corresponding to the MFP 100. In step S1302, the OS 600 issues a device connection command to the scanner driver 700 to request an establishment of connection with the MFP 100. In step S1303, the OS 600 issues a button monitoring request command to the scanner driver 700 so that a button event is received when the button event occurs in the MFP 100.

Upon receipt of the button monitoring request command subsequent to the activation, the scanner driver 700 causes the button event monitoring unit 703 to regularly perform polling to monitor a button event of the MFP 100. When the user operates a reading operation start key on the operation panel 400 of the MFP 100, the button event monitoring unit 703 of the scanner driver 700 detects such a button event. In step S1304, an event information acquisition unit 704 acquires the event information corresponding to the detected button event, and an SL communication control unit 701 notifies an SL 601 of the event information. In setting contents of the event information, as a setting value, a photograph, a document, mail or the like are stored. Moreover, the scanner driver 700 internally retains (in an area inside a memory 204 referable by the scanner driver 700) a scan setting corresponding to a document type (setting of the event information in step S1304) used when pseudo-push scan is performed.

In step S1305, when receiving the event information notification, the SL 601 issues a scan request command to the scanner driver 700. Upon receipt of the scan request command, the scanner driver 700 causes the scanner unit 102 of the MFP 100 to execute a scan operation based on the scan setting internally retained therein. The scanner driver 700 causes an image data acquisition unit 702 to acquire image data obtained by the scan operation, and generates an image file in a designated file format. In a case where a storage folder or a file name for the image data cannot be set using the operation panel 400 of the MFP 100, the image file may be generated according to an initial value (a default setting) of the scanner driver 700. In step S1306, when the generation of the image file is completed, the scanner driver 700 notifies the SL 601 of completion of the scan operation.

In step S1307, when receiving the scan completion notification, the SL 601 designates the image data generated by the scanner driver 700 in step S1306, and activates the scan application 500 associated with the event type by the application registration unit 604. Thus, the designated image file can be supplied to the activated scan application 500. The activated scan application 500 displays the image indicating this image file, and receives an instruction such as editing, processing, and mail transmission from the user. In step S1308, the SL 601 issues a button monitoring request command to the scanner driver 700 having notified the scan completion, thereby resuming the button polling.

In the present exemplary embodiment, the scanner driver 700 generates the image file based on the image data acquired from the MFP 100. Alternatively, the MFP 100 can generate an image file, and then the scanner driver 700 can receive the image file.

Therefore, in the present exemplary embodiment, the PC 200 serving as an information processing apparatus that controls the scanner (the MFP 100) detects a reading instruction and a reading setting made in the MFP 100 (see step S1304). If this reading instruction is detected, a reading operation according to the reading setting is executed by the MFP 100 through the OS 600 (ee step S1305). Then, the image data acquired by the MFP 100 executing the reading operation is supplied to the scan application 500 (see step S1307). In particular, the scanner driver 700 notifies the OS 600 of the content of the event (the reading instruction) arising on the operation panel 400 of the MFP 100 when detecting the button event, and retains the scan setting (the reading setting) made on the operation panel 400. Subsequently, the scanner driver 700 causes the MFP 100 to execute the scan operation according to the retained reading setting. Upon receipt of the event notification, the OS 600 obtains the image data acquired by executing the scan operation from the scanner driver 700, and activates the scan application 500 corresponding to the event. Then, the OS 600 transfers the acquired image file. Since the scanner driver 700 causes the MFP 100 to execute the scan operation according to the scan setting retained therein, the OS 600 can make the pseudo-push-scan function available to a user with a simple operation of the scanner, even on the OS using the sandbox technology.

Moreover, since the SL 601 of the OS 600 issues the scan request command to the scanner driver 700, the application to be activated by the push-event does not necessarily have a function of issuing a scan request to the scanner driver 700. Therefore, the user can use more applications.

Next, a third exemplary embodiment of the present invention is described. In the third exemplary embodiment, an application activated from an OS when a push-scan event occurs, inquires a scan driver about the presence or absence of the event, and receives event information. In the third exemplary embodiment, since configurations of an MFP and a PC, a schematic configuration of a system, and a layout configuration of an operation panel can be substantially the same as those described above with reference to FIGS. 1 through 3, descriptions thereof are omitted.

Moreover, since a scan setting, a software configuration in the PC, and selection of an application to be activated in a push-event in the present exemplary embodiment can be substantially the same as those described above with reference to FIGS. 4 through 6, and 9, descriptions thereof are omitted.

Figure 11:
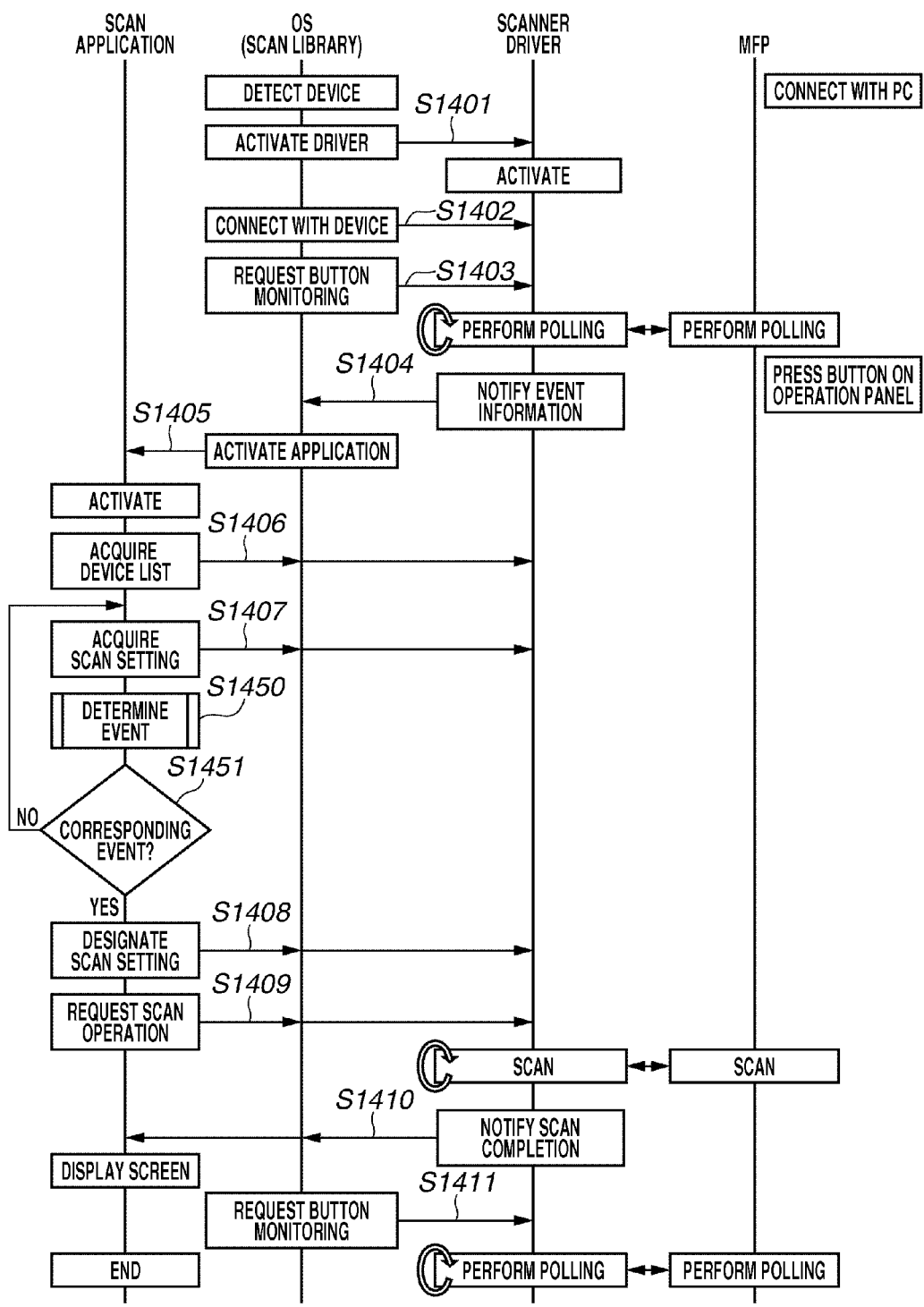

FIG. 11 is a flowchart including sequences performed when pseudo-push-scan is performed by using an MFP 100 and a PC 200. Assume that an OS 600 of the PC 200 offers a high level security using a sandbox technology, and a scan application 500 and a scanner driver 700 are sandboxed programs.

In step S1401, when a device detection unit 602 detects the MFP 100, the OS 600 causes a scanner driver activation control unit 603 to activate the scanner driver 700 corresponding to the MFP 100. In step S1402, the OS 600 issues a device connection command to the scanner driver 700 to request an establishment of connection with the MFP 100. In step S1403, the OS 600 issues a button monitoring request command to the scanner driver 700 so that a button event is received when the button event occurs in the MFP 100.

Upon receipt of the button monitoring request command subsequent to the activation, the scanner driver 700 causes the button event monitoring unit 703 to regularly perform polling to monitor a button event of the MFP 100. When a user operates a reading operation start key on an operation panel 400 of the MFP 100, the button event monitoring unit 703 of the scanner driver 700 detects such a button event. In step S1404, an event information acquisition unit 704 acquires the event information corresponding to the detected button event, and an SL communication control unit 701 notifies an SL 601 of the event information. In a setting content of the event information, a scan setting value set by using the operation panel 400 is stored as an event type. Moreover, the scanner driver 700 internally retains (in an area inside a memory 204 referable by the scanner driver 700) a scan setting (setting of the event information in step S1404) corresponding to the document type for push-scan, and date and time information when the event occurs (occurrence time). The date and time information of event occurrence may be acquired from the MFP 100 when event information is acquired, or acquired from a clock function inside the PC 200 when the event is detected by the PC 200.

In step S1405, when receiving the event information notification, the SL 601 causes an application activation control unit 605 to activate the scan application 500 registered in association with the event by an application registration unit 604. In step S1406, when activated by the SL 601, the scan application 500 issues a device list acquisition command to the scanner driver 700, and acquires a list of the devices connected to the PC 200 corresponding to the scanner driver 700. Herein, the scan application 500 internally retains date and time information (activation time) of the activation. Assume that the date and time information is acquired similar to that described above. In step S1407, the scan application 500 issues a scan setting acquisition command to the scanner driver 700 for the device selected from the device list (assume that the MFP 100 is selected), and acquires a scan setting as a response to the command. The contents of the scan setting to be acquired in step S1407 include device capability information such as an optical resolution, a reading settable area, and the presence or absence of ADF and film scan supports. Moreover, the scan setting includes a scan setting corresponding to a document type for pseudo-push-scan, and date and time information of event occurrence as illustrated in FIG. 13. If the scanner driver 700, which received the scan setting command in step S1407, has acquired event information in step S1404, this event information is added to the scan setting.

Figure 12:
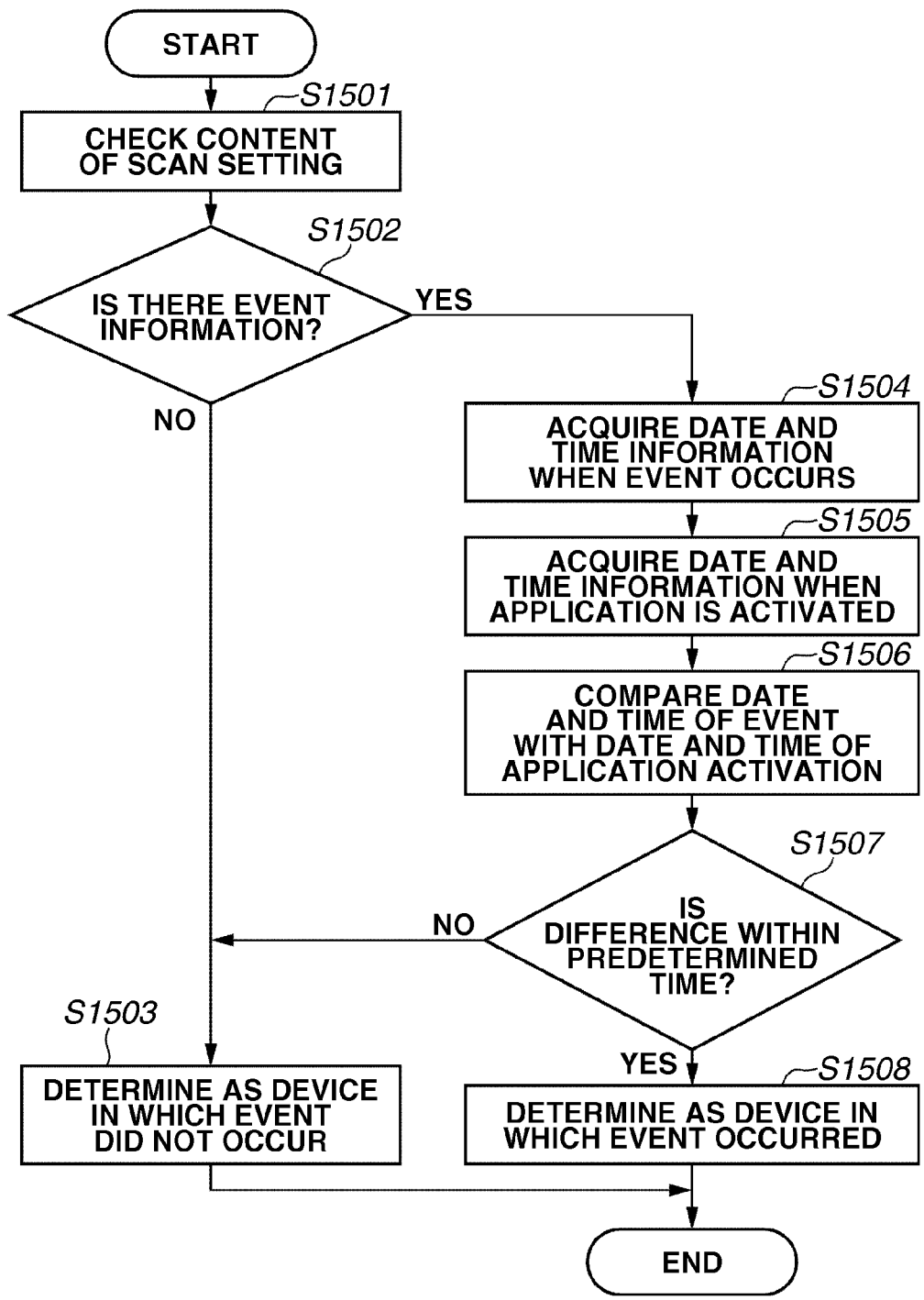
FIG. 12 is a flowchart illustrating processing performed by the scan application to identify a device in which a push-scan event occurs.

In step S1450, the scan application 500 refers to the contents of the scan setting acquired in step S1407, and determines whether the device indicated by the information acquired in step S1406 is the device in which the push-scan event occurs. Such event determination processing in step S1450 is described in detail with reference to a flowchart illustrated in FIG. 12. In step S1501, the scan application 500 refers to the contents of the acquired scan setting. In step S1502, the scan application 500 determines whether the contents of the acquired scan setting include the event information of the push-scan. If the event information is not included (NO in step S1502), then in step S1503, the scan application 500 determines that the device indicated by the information acquired in step S1406 in FIG. 11 is not the device in which the push-scan has occurred, and the processing ends. If the event information is included (YES in step S1502), then in step S1504, the scan application 500 acquires the date and time information of event occurrence. Subsequently, in step S1505, the scan application 500 acquires the date and time information of application activation internally retained therein. In step S1506, the scan application 500 compares the date and time of event occurrence with the date and time of application activation. In step S1507, the scan application 500 determines whether a time difference between these is within a predetermined time based on the comparison. If the difference is not within the predetermined time (NO in step S1507), for example, an event occurred one hour or more ago, the operation proceeds to step S1503. In step S1503, the scan application 500 determines that the push-scan did not occur in this device, and the processing ends. If the difference is within the predetermined time (YES in step S1507), for example, an event occurred one second ago, the operation proceeds to step S1508. In step S1508, the scan application 500 determines that the device indicated by the information acquired in step S1406 in FIG. 11 is the device in which the push-scan has occurred, and the processing ends. The predetermined time can be fixed, or determined by the user as needed.

Based on the event determination processing in step S1450, if the scan application 500 determines that the device indicated by the information acquired in step S1406 is the device in which the push-scan has occurred (YES in step S1451), the operation proceeds to step S1408. In step S1408, the scan application 500 issues a scan setting designation command to the scanner driver 700 based on the scan setting acquired in step S1407 so that the pseudo-push-scan is performed.

In step S1409, when receiving a success response to the scan setting designation command, the scan application 500 issues a scan request command to the scanner driver 700 based on the scan setting. Upon receipt of the scan request command, the scanner driver 700 obtains image data from the MFP 100 based on the designated scan setting. The image data corresponds to an image acquired by the scan operation based on the scan setting. Then, the scanner driver 700 generates an image file in a designated file format. In step S1410, when the generation of the image file is completed, the scanner driver 700 notifies the scan application 500 of completion of the scan operation, and transmits the image file to the scan application 500.

Upon receipt of the scan completion notification and the image file, the scan application 500 displays an image corresponding to the image file generated by the scanner driver 700 on a screen. For example, an image can be displayed as a thumbnail image on a main dialog box of the scan application 500, or displayed as an image file on a standard file management screen of the OS. In step S1411, the SL 601 issues a button monitoring request command to resume the button polling, to the scanner driver 700 which has notified the scan completion.

Based on the event determination processing in step S1450, if the scan application 500 determines that the device indicated by the information acquired in step S1406 is not the device in which the push-scan has occurred (NO in step S1451), the scan application 500 does not issue a scan setting designation command or a scan request command. If there is a plurality of devices in the device list acquired in step S1406, the event determination processing is performed on each of the devices. Alternatively, the event determination processing may be performed on only a target device registered beforehand by the user.

In the event determination processing in step S1450, the date and time of event occurrence and the date and time of application activation are compared. However, in a case where the scan application 500 is already activated at the time of event occurrence, the data and time of event occurrence may be compared with date and time when notification of activation instruction such as re-activation is received from the SL 601, instead of comparison with the date and time of application activation.

In the present exemplary embodiment, therefore, the PC 200 serving as an information processing apparatus that controls a scanner (the MFP 100) detects a reading instruction and a reading setting made in the MFP 100 (see steps S1404 and S1407). When the reading instruction is detected, the scan application 500 is activated (see step S1405). Moreover, the PC 200 acquires each of the occurrence time of the reading instruction and the activation time of the application (see steps S1450, S1504, S1505). Subsequently, the PC 200 determines whether a time difference between these two acquired times is within a predetermined time (see steps S1451, S1506, S1507). If the difference is determined as being within the predetermined time, the scan application 500 instructs the MFP 100 to execute a reading operation according to the reading setting (see steps S1408, S1409). Particularly, the scanner driver 700 retains the content of the event input on the operation panel 400 of the MFP 100 and date and time of the event occurrence when a button event is detected. The scan application 500 checks the presence or absence of the event occurrence in the scanner driver 700, and compares the date and time of event occurrence and the date and time of application activation or date and time in which an activation instruction is received. Then, the scan application 500 checks whether a time difference between these is within a predetermined time. If the difference is within the predetermined time, the scan operation is executed according to the content designated by using the operation panel 400. Herein, the scan application 500 acquires a reading setting from the scanner driver 700 through the OS 600 (the SL 601). This can make the pseudo-push-scan function available to a user with a simple operation of the scanner by using a general-purpose application, even on the OS at a high security level employing a sandbox technology. Moreover, the occurrence time of the reading instruction and the activation time of the application activated in response to the reading instruction are referred, so that the scanner having issued a reading instruction can be readily specified, and intended processing can be executed. In the present exemplary embodiment, although date and time information is used, time information may be used without date information.

In the first exemplary embodiment, the pseudo-push scan is executed by simply following the scan setting made on the operation panel 400 of the MFP 100. That is, according to the first exemplary embodiment, there is no inconsistency (inconvenience is not generated) between the scan setting made on the operation panel 400 of the MFP 100 and the scan setting in the scan application 500. However, there are cases where an inconsistency occurs in the scan settings. Hereinafter, a third exemplary embodiment is described concerning such a case.

Figure 14:
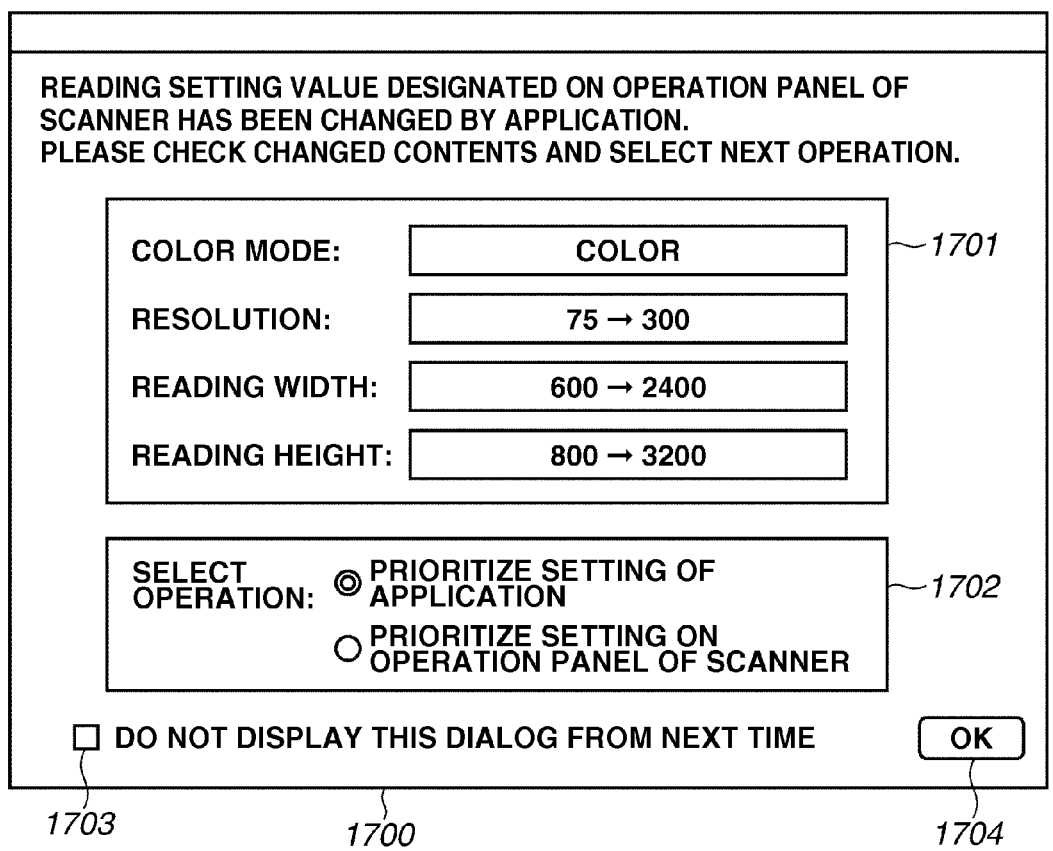
FIG. 14 is a diagram illustrating an example of a screen displayed when a scan setting is different from a designated scan setting in the push-scan.

In FIG. 14 is a diagram illustrating an example of a screen displayed on a display device 205 in a scan setting designation command (see step S907) if a setting different from a scan setting designated on an operation panel 400 of an MFP 100 by a user is designated. In a scan setting information field 1701 of a scan setting change check dialog box 1700, a scan setting designated on the operation panel 400 of the MFP 100 and a scan setting changed by a scan application 500 are displayed. In an operation selection field 1702, a user makes a selection to determine whether to prioritize the setting of the scan application 500 or the setting on the operation panel 400 of the MFP 100. A check box 1703 is used by the user to indicate whether this dialog box should be displayed from a next pseudo-push-scan operation. An OK button 1704 is used to retain the selected content, and the operation designated in the operation selection filed 1702 is executed.

For example, the screen illustrated in FIG. 14 is displayed where the scan application 500 is OCR software. Since resolution of image data to be scanned demands character recognition accuracy, there are cases where the OCR software requests a resolution of 300 dpi or higher. Suppose that a resolution designated on the operation panel 400 of the MFP 100 is 75 dpi, if a scan setting is not changed by the scan application 500, scanned image data with 75 dpi is provided to the scan application 500. Consequently, there are cases where an error occurs due to inappropriate processing performed on the image data by the scan application 500, causing deterioration in user convenience. Accordingly, the display of this dialog box 1700 not only notifies the user of changed contents, but also allows the user to select a next operation, thereby enhancing user convenience.

Figure 15:
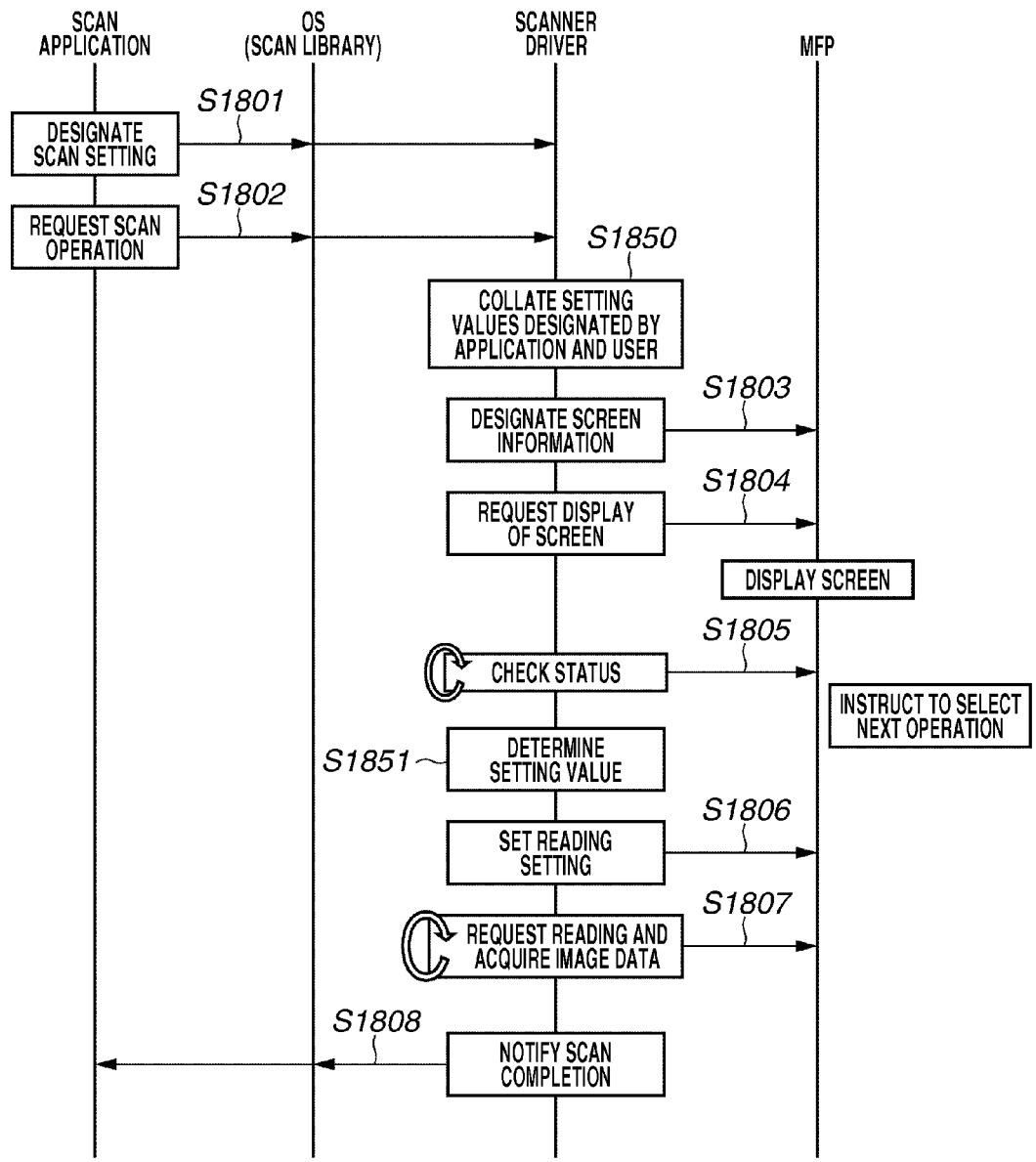

A scanner driver 700 can display this scan setting change check dialog box 1700 on a display device 205 of a PC 200, or a display unit 401 of the MFP 100. Alternatively, the scanner driver 700 may display the scan setting change check dialog box 1700 on both of the display device 205 and the display unit 401. FIG. 15 is a flowchart including sequences performed when the scan setting change check dialog box 1700 is displayed on the display unit 401 of the MFP 100. This flowchart illustrates subsequent processing to be performed when the processing up to step S906 of the flowchart illustrated in FIG. 7 has been performed.

In step S1801, the scan application 500 issues a scan setting designation command so that the pseudo-push-scan is performed. In step S1802, when receiving a success response to the scan setting designation command, the scan application 500 issues a scan request command. In step S1850, when receiving the scan request command, the scanner driver 700 collates the scan setting value designated from the scan application 500 and the scan setting value designated on the operation panel 400 of the MFP 100 by the user. In step S1803, if there is a change in the scan setting value, the scanner driver 700 issues a screen information designation command to the MFP 100, and designates a display content. In step S1804, the scanner driver 700 issues a screen display request command to display the scan setting change check dialog box 1700 on the display unit 401 of the MFP 100.

In step S1805, the scanner driver 700 inquires about an operation event on the operation panel 400 of the MFP 100 by regularly issuing a status check command. In step S1851, if a selection instruction for selecting a next operation is received from the user, the scanner driver 700 determines a scan setting value to be used depending on the content of the selection instruction. That is, the scanner driver 700 determines whether to use the scan setting value designated from the scan application 500 or the scan setting value designated on the operation panel 400 of the MFP 100 by the user. In step S1806, the scanner driver 700 issues a reading setting command based on the determined scan setting value. In step S1807, the scanner driver 700 issues a reading request command to the MFP 100, and obtains image data acquired by the MFP 100 scanning an image. In step S1808, when an image file in a designated file format is generated, the scanner driver 700 notifies the scan application 500 of completion of the scan operation.

Therefore, in the present exemplary embodiment, the PC 200 serving as an information processing apparatus that controls the scanner (the MFP 100) can detect a scan setting (a reading setting) set on the MFP 100, and change the scan setting (see step S1851). Herein, if the reading setting and the reading setting made by the scan application 500 differ from each other, the PC 200 can change the setting to the reading setting made by the scan application 500. Moreover, the user can make a selection to determine whether to prioritize the detected reading setting (the reading setting made on the MFP 100) or the reading setting made by the scan application 500 (in the operation selection field 1702). Herein, if the reading setting made by the scan application 500 is selected as a priority setting, the reading setting is changed.

In the present exemplary embodiment, a scan setting made on the operation panel 400 and a scan setting made by the scan application 500 are not necessarily different from each other. The present exemplary embodiment may be applied to a case where the scan application 500 cannot acquire an image according to a scan setting made on the operation panel 400.

Accordingly, in addition to the effects of the first exemplary embodiment, the present exemplary embodiment can perform appropriate processing if there is inconsistency between a scan setting made on the operation panel 400 and a scan setting in the scan application 500, or if a scan setting made on the operation panel 400 of the MFP 100 cannot be acquired.

According to the exemplary embodiments, pseudo-push scan is executed by using a scanner connected to the PC 200. However, each of the exemplary embodiments may be applied to a case where the PC 200 and the scanner are integrated. Moreover, although the scanner scans an image on a document to input image data in each of the exemplary embodiments, image data may be input by other methods including image capturing by a digital camera. Moreover, above exemplary embodiments may be combined as needed.

Moreover, each of the above exemplary embodiments can be achieved by executing the following processing. That is, the software (program) capable of achieving functions of the above exemplary embodiment is supplied to a system or an apparatus through a network or various storage medium, and the program is read and executed by the system or a computer (e.g., a CPU, or a micro-processing unit (MPU)) of the apparatus. Moreover, the program may be executed by one computer or a plurality of computers operating in conjunction with one another. All of the above described processing is not necessarily executed by the software. A part of or the entire processing may be executed by hardware.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-153674 filed Jul. 9, 2012, which is hereby incorporated by reference herein in its entirety.

What is claimed is:

1. An information processing apparatus capable of communicating with a reading apparatus, the information processing apparatus comprising:
a reception unit configured to receive an activation instruction generated based on an event issued by the reading apparatus in accordance with an instruction of a reading operation input in the reading apparatus, wherein a scanner driver corresponding to the reading apparatus receives the event including a reading setting;
a list acquiring unit configured to acquire a list from the scanner driver if the activation instruction is received, wherein a reading apparatus included in the list connects to the information processing apparatus and corresponds to the scanner driver;
a selection unit configured to select a reading apparatus from the list;
an acquiring unit configured to acquire the reading setting of the selected reading apparatus from the scanner driver;
a first acquisition unit configured to acquire an occurrence time of the event;
a second acquisition unit configured to acquire an activation time when an application is activated by the activation instruction;
a time determination unit configured to determine whether a time difference between the occurrence time acquired by the first acquisition unit and the activation time acquired by the second acquisition unit is within a predetermined time;
a determination unit configured to determine that the selected reading apparatus corresponds to the reading apparatus which has generated the event when the time determination unit determines that the time difference is within the predetermined time; and
an instruction unit configured, if it is determined that the selected reading apparatus corresponds to the reading apparatus which has generated the event, to cause the reading apparatus to execute the reading according to the acquired reading setting,
wherein the reception unit, the list acquiring unit, the selection unit, the acquiring unit, the first acquisition unit, the second acquisition unit, the time determination unit, the determination unit and the instruction unit are executed by a processor.

2. The information processing apparatus according to claim 1, further comprising a change unit configured to change the reading setting, with the application, wherein the change unit is executed by the processor.

3. The information processing apparatus according to claim 1 further comprising an addition unit configured to add, by the application, another setting to the acquired reading setting, wherein the instruction unit instructs a driver of the reading apparatus to perform processing based on the setting added by the addition unit, wherein the addition unit is executed by the processor.

4. The information processing apparatus according to claim 1, further comprising an event determination unit configured to determine whether the reading setting includes event information or not, wherein if it is determined that the reading setting includes the event information and the time difference is within the predetermined time, the determination unit determines that the selected reading apparatus corresponds to the reading apparatus which has generated the event, wherein the event determination unit is executed by the processor.

5. The information processing apparatus according to claim 1, wherein if it is determined that the selected reading apparatus does not correspond to the reading apparatus which has generated the event, processing of the selection unit, the acquiring unit and the determination unit is performed again.

6. The information processing apparatus according to claim 1, wherein if it is determined that the reading setting does not include the event information, the determination unit determines that the selected reading apparatus does not correspond to the reading apparatus which has generated the event, without accepting the determination result of the time difference.

7. The information processing apparatus according to claim 1, wherein if the apparatus becomes communicable with the reading apparatus, a scanner driver for the reading apparatus is activated, and if the apparatus is disconnected from the reading apparatus, the scanner driver is terminated.

8. The information processing apparatus according to claim 1, wherein an operating system included in the apparatus employs a sandbox technology.

9. A control method for an information processing apparatus capable of communicating with a reading apparatus generating an event by an instruction of a reading operation, the method comprising:

receiving an activation instruction generated based on an event issued by the reading apparatus in accordance with an instruction of a reading operation input in the reading apparatus, wherein a scanner driver corresponding to the reading apparatus receives the event including a reading setting;

acquiring a list from the scanner driver if the activation instruction is received, wherein a reading apparatus included in the list connects to the information processing apparatus and corresponds to the scanner driver;

selecting a reading apparatus from the list;

acquiring the reading setting of the selected reading apparatus from the scanner driver;

acquiring an occurrence time of the event, and an activation time when an application is activated by the activation instruction;

determining whether a time difference between the occurrence time and the activation time is within a predetermined time, and when the determining determines that the time difference is within the predetermined time, further determining that the selected reading apparatus corresponds to the reading apparatus which has generated the event; and causing, if it is determined that the selected reading apparatus corresponds to the reading apparatus which has generated the event, the reading apparatus to execute the reading according to the acquired reading setting.

10. The control method according to claim 9 further comprising changing the detected reading setting, with the application.

11. The control method according to claim 9, further comprising adding another setting to the acquired reading setting, wherein a driver of the reading apparatus is instructed to perform processing based on the added setting.

12. The control method according to claim 9, further comprising determining whether the reading setting includes event information or not, wherein if it is determined that the reading setting includes the event information and the time difference is within the predetermined time, the determining determines that the selected reading apparatus corresponds to the reading apparatus which has generated the event.

13. The control method according to claim 9, wherein if it is determined that the selected reading apparatus does not correspond to the reading apparatus which has generated the event, the selecting, acquiring the reading setting, and determining are performed again.

14. The control method according to claim 9, wherein if it is determined that the reading setting does not include the event information, the determining determines that the selected reading apparatus does not correspond to the reading apparatus which has generated the event, without accepting the determination result of the time difference.

15. The control method according to claim 9, wherein if the apparatus becomes communicable with the reading apparatus, a scanner driver for the reading apparatus is activated, and if the apparatus is disconnected from the reading apparatus, the scanner driver is terminated.

16. The control method according to claim 9, wherein an operating system included in the information processing apparatus employs a sandbox technology.

17. A computer readable non-transitory storage medium storing a program capable of causing a computer to execute a control method, the computer being capable of communicating with a reading apparatus generating an event by an instruction of a reading operation, the control method comprising:

receiving an activation instruction generated based on an event issued by the reading apparatus in accordance with an instruction of a reading operation input in the reading apparatus, wherein a scanner driver corresponding to the reading apparatus receives the event including a reading setting;

acquiring a list from the scanner driver if the activation instruction is received, wherein a reading apparatus included in the list connects to the information processing apparatus and corresponds to the scanner driver;

selecting a reading apparatus from the list;

acquiring the reading setting of the selected reading apparatus from the scanner driver;

acquiring an occurrence time of the event, and an activation time when an application is activated by the activation instruction;

determining whether a time difference between the occurrence time and the activation time is within a predetermined time, and when the determining determines that the time difference is within the predetermined time, further determining that the selected reading apparatus corresponds to the reading apparatus which has generated the event; and causing, if it is determined that the selected reading apparatus corresponds to the reading apparatus which has generated the event, the reading apparatus to execute the reading according to the acquired reading setting.

* * * * *